United States Patent
Wagner et al.

(10) Patent No.: US 7,536,507 B1
(45) Date of Patent: May 19, 2009

(54) METHODS, SYSTEMS, AND COMPUTER PROGRAM PRODUCTS FOR PRESERVING ATOMIC WRITES USING LEAVES AND BITMAPS

(75) Inventors: Michael P. Wagner, Raleigh, NC (US); Dave Harvey, Newton, MA (US); Sriram Nagasubramanian, Morrisville, NC (US)

(73) Assignee: EMC Corporation, Hopkinton, MA (US)

( * ) Notice: Subject to any disclaimer, the term of this patent is extended or adjusted under 35 U.S.C. 154(b) by 228 days.

(21) Appl. No.: 11/393,467

(22) Filed: Mar. 30, 2006

(51) Int. Cl.
*G06F 12/00* (2006.01)

(52) U.S. Cl. .................. 711/114; 711/154; 711/162; 711/165

(58) Field of Classification Search .......... 711/114, 711/154, 162, 165
See application file for complete search history.

(56) References Cited

U.S. PATENT DOCUMENTS

| | | | | |
|---|---|---|---|---|
| 6,182,089 | B1 * | 1/2001 | Ganapathy et al. | 707/206 |
| 7,352,739 | B1 * | 4/2008 | Rangarajan et al. | 370/378 |
| 2002/0078244 | A1 * | 6/2002 | Howard | 709/248 |
| 2004/0260673 | A1 * | 12/2004 | Hitz et al. | 707/1 |
| 2006/0085485 | A1 * | 4/2006 | Shimshoni | 707/200 |
| 2007/0050381 | A1 * | 3/2007 | Hu et al. | 707/100 |

\* cited by examiner

*Primary Examiner*—Reba I Elmore
(74) *Attorney, Agent, or Firm*—Jenkins, Wilson, Taylor & Hunt, P.A.

(57) ABSTRACT

Methods, systems, and computer program products for preserving atomic writes to disk arrays are disclosed. According to one method, portions of a file are stored in paired locations on a disk array such that a first location of a location pair for a file portion stores scratch data for the file portion and a second portion of the location pair for the file portion stores valid data for the file portion. A bitmap is stored on the disk array. The bitmap has bits indicating whether valid data for each file portion resides in the first or the second location for its respective location pair. A write request to write data to a portion of the file being less than the entire file is received. The bitmap indicates that valid data for the portion of the file to be written to resides in a first memory location of one of the location pairs on the disk array. In response to the write request, the bitmap is copied to memory, the data for the portion of the file requested to be modified is copied from the first location of the one location pair to a second location of the one location pair on the disk array without copying the entire file and modifying the data in the second location based on the data to be written. The bitmap stored in memory is modified to indicate that valid data for the portion of the file resides in the second location of the one location pair and that scratch data for the portion of the file resides in the first location on the disk array. A request to save the modification is received, and, in response to the request to save the modified data, the bitmap stored on the disk array is replaced with the modified bitmap.

18 Claims, 6 Drawing Sheets

METHODS, SYSTEMS, AND COMPUTER PROGRAM PRODUCTS FOR PRESERVING ATOMIC WRITES USING LEAVES AND BITMAPS

TECHNICAL FIELD

The subject matter described herein relates to preserving atomic write operations to a disk array. More particularly, the subject matter described herein relates to preserving atomic write operations to a disk array using leaves and bitmaps.

BACKGROUND ART

When writing data to a disk array, it is desirable to define write operations that are atomic at some level. An atomic write operation is a write operation that cannot be broken into smaller parts. For example, there will not be a partial atomic write operation. Either the write operation occurs in full, or it does not occur at all.

The following example illustrates the importance of an atomic write operation. In the example, it is assumed that the atomic write operation covers 18 characters of data. The example is as follows:

1. User A writes "foofoofoofoofoofoo".
2. User B writes "barbarbarbarbarbar".

In this example, it is assumed that User A and User B are writing to the same location on a disk array. As a result, depending on the order of the operations and assuming that the write operation is atomic, a third user, User C, who reads the data from the location will either read "foofoofoofoofoofoo" or "barbarbarbarbarbar". There is no possibility for User C to read "barbarbarfoofoofoo".

One conventional method for implementing atomic writes to a disk array copies an entire file being written to from a first location on the disk array to a second location on the disk array, even when only a portion of the file is being modified. For example, if an application writes four bytes to a four megabyte file, this conventional method copies the four megabyte file from a first location on the disk array to a second location on the disk array. Modifications to the four megabyte file are made in the second location, referred to as the scratch location. If the application saves the changes, a pointer is updated to point to the second location. If a save operation does not occur, for example, because of a power interruption, the pointer is not updated, thus preserving the original file. Thus, atomic writes were conventionally preserved by copying the entire file from one location to another and only updating the pointer to point to the modified file when a save operation occurred.

One problem with this conventional method for preserving atomic writes is that it is inefficient to copy an entire file from one location on the disk array to another location on the disk array when only a portion of the file is being modified. Accordingly, there exists a need for improved methods, systems, and computer program products for preserving atomic writes to a disk array.

SUMMARY

According to one aspect, the subject matter described herein includes a method for preserving an atomic write to a disk array using bitmaps and leaves. The method includes storing a file and a bitmap on a disk array. The bitmap includes bits indicating where valid data for leaves of the file reside on the disk array. The file is stored in a first location on the disk array. In response to receiving a request to modify one or more leaves of the file, the bitmap is copied to memory. The data for leaves of the file requested to be modified is copied to a second location on the disk array. The data stored in the second location is modified. The bitmap stored in memory is modified to indicate that the valid data for the leaves of the file that were modified resides in the second location on the disk array. In response to receiving a save request, the modified bitmap stored in memory replaces the original bitmap stored on the disk array.

The subject matter described herein for implementing atomic writes using bitmaps and leaves may be implemented using a computer readable medium having stored thereon computer executable instructions that when executed by the processor of a computer perform steps of the aforementioned method. Exemplary computer readable media suitable for implementing the subject matter described include disk memory devices, chip memory devices, application specific integrated circuits, and programmable logic devices. In one implementation, the computer readable medium may include a memory accessible by a processor. The memory may include instructions executable by the processor for implementing any of the methods for preserving atomic writes to a disk array using bitmaps and leaves described herein. In addition, a computer readable medium that implements the subject matter described herein may be implemented on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
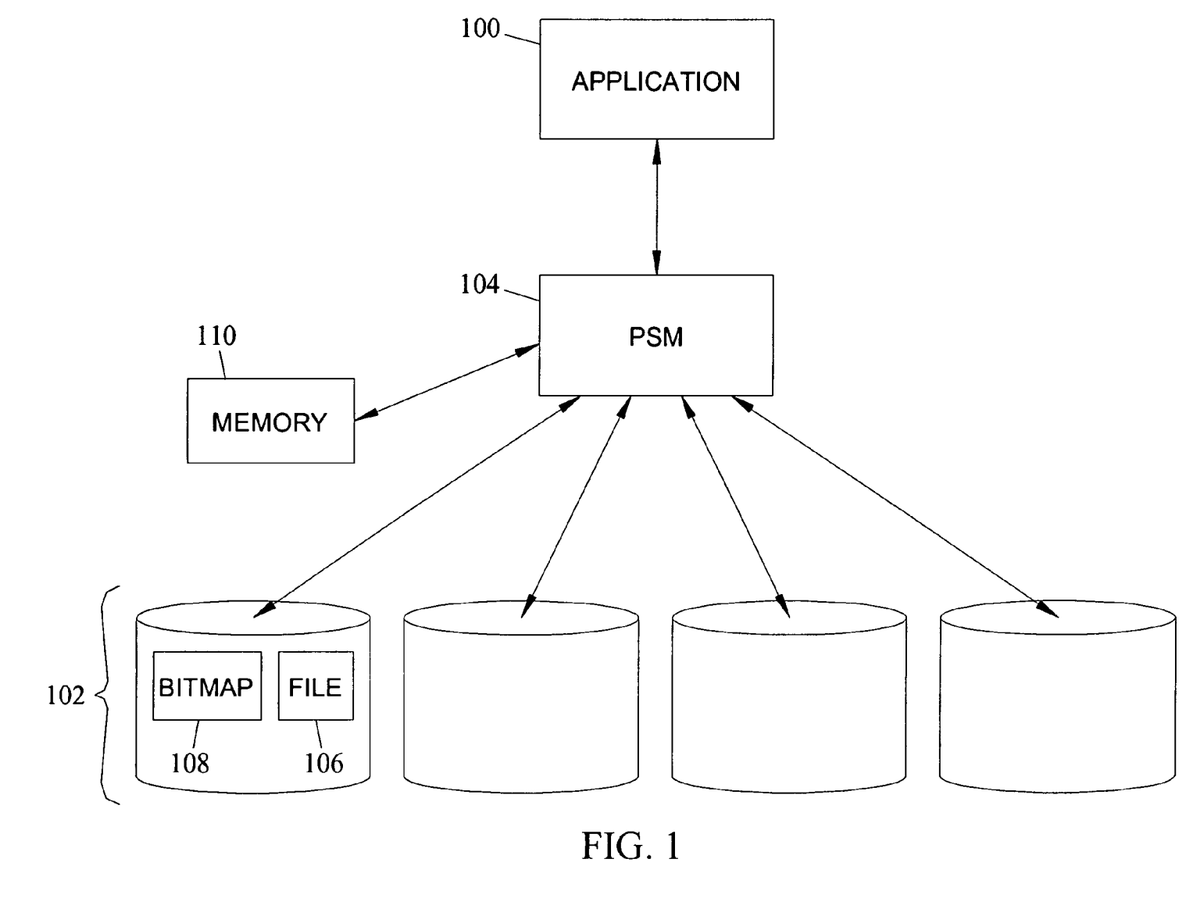
FIG. 1 is a block diagram illustrating an exemplary system for implementing atomic writes to a disk array using bitmaps and leaves according to an embodiment of the subject matter described herein.

FIG. 1 is a block diagram illustrating an exemplary operating environment for a system for preserving atomic writes to a disk array using bitmaps and leaves according to an embodiment of the subject matter described herein. In FIG. 1, an application 100 may desire to write data to disk array 102. In order to write such data, application 100 may request that a persistent storage manager (PSM) 104 perform the actual write operation. Persistent storage manager 104 stores configuration information about disk array 102 and handles read and write requests from application 100. For example, in response to a request to write data to disk array 102, persistent storage manager 104 may map the write request to a file 106 on disk array 102. Persistent storage manager 104 may maintain a bitmap 108 on disk array 102 that includes bits that indicate where valid data for file 106 resides.

In response to the write operation affecting some of the contents of file 106, persistent storage manager 104 may copy bitmap 108 to memory 110. As discussed above, in prior systems, persistent storage manager 104 would make an entire scratch copy of file 106 at another location on disk array 102 and store user modifications to the file in the scratch copy. However, according to the present embodiment, persistent storage manager 104 may only copy portions of the file being modified by application 100. Persistent storage manager 104 may update bits in the copy of bitmap 108 that resides in memory 110 to indicate whether valid portions of the file reside in the original location of the file or in the scratch location where the changed portions of the file are copied. When a save or commit request is received from application 100, persistent storage manager 104 may replace the old bitmap 108 with the modified bitmap stored in memory 110. If a save operation does not occur, for example, due to a power interruption, the old bitmap remains in disk storage, the modified bitmap is discarded, and the pre-modification contents of file 106 remain valid.

One commercially available example of a disk array and associated persistent storage manager suitable for implementing the subject matter described herein is the CLARiiON® disk array platform available from EMC Corporation of Hopkinton, Mass. However, the subject matter described herein is not limited to the CLARiiON® platform. The methods described herein for preserving atomic writes to a disk array can be implemented on any platform that includes a disk array without departing from the scope of the subject matter described herein.

Figure 2:
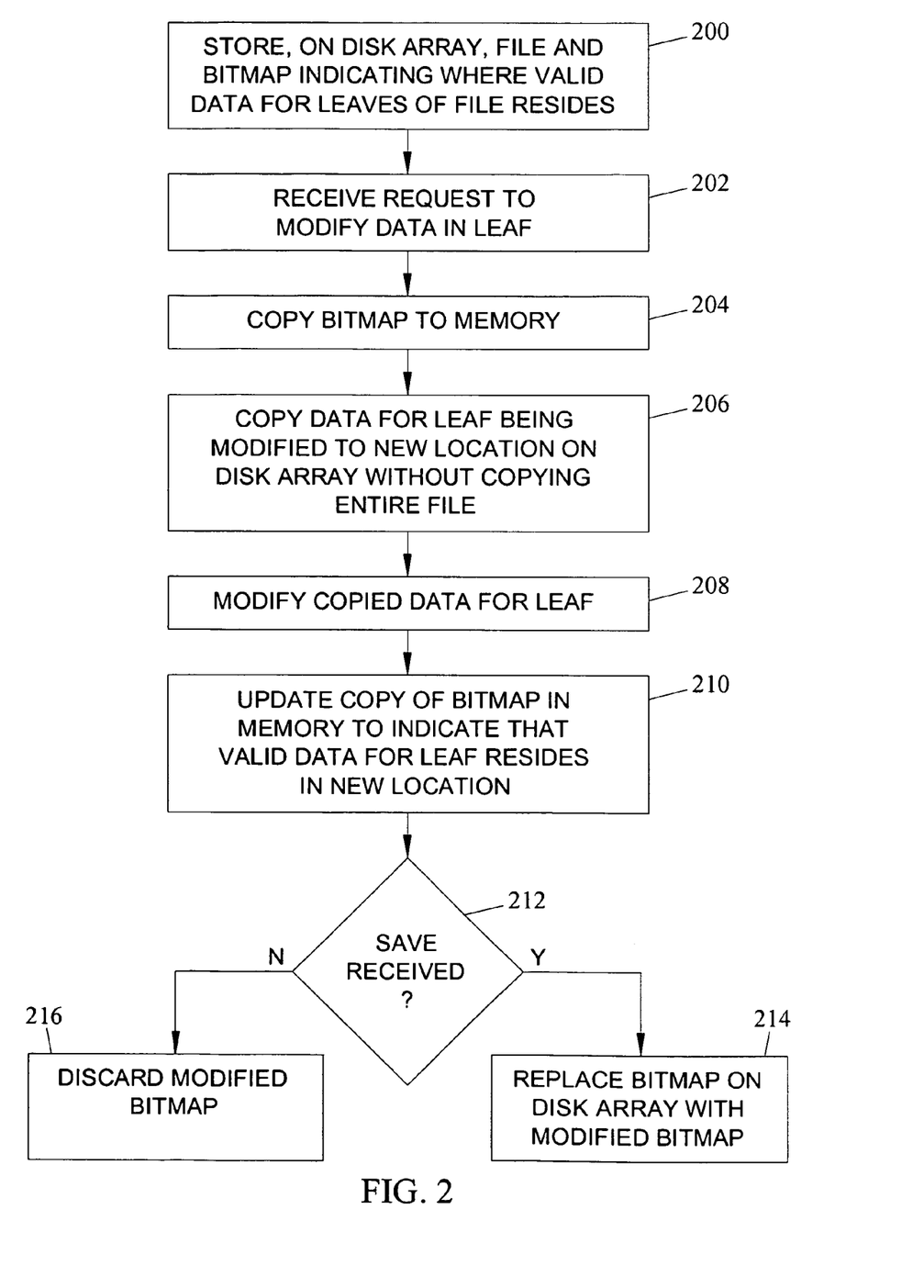
FIG. 2 is a flow chart illustrating exemplary steps for preserving atomic writes to a disk array using bitmaps and leaves according to an embodiment of the subject matter described herein.

FIG. 2 is a flow chart illustrating exemplary steps for preserving atomic writes to a disk array using bitmaps and leaves according to an embodiment of the subject matter described herein. Referring to FIG. 2, in step 200, a file and a bitmap are stored on a disk array. The bitmap includes bits indicating where valid and scratch data for the file reside on the disk array. As used herein, a leaf refers to a portion of data in a file represented by one or more bits in bitmap 108. In step 202, a request is received to modify data in one of the leaves. In step 204, bitmap 108 is copied from the disk array to memory. In step 206, data for the leaf being modified is copied to a new location on the disk array without copying the entire file (unless the entire file is being modified). In step 208, the data copied for the leaf is modified. In step 210, the copy of the bitmap stored in memory 110 is updated to indicate that valid data for the modified leaf resides in the new location on the disk array.

In step 212, it is determined whether a save operation has been received or detected. If a save has been detected, control proceeds to step 214 where bitmap 108 stored on the disk array is replaced with the modified bitmap stored in memory 110. If a save operation is not received, control proceeds to step 216 where the modified bitmap is discarded. Thus, even if the portion of the file stored in the new location on the disk array is modified, the partial write will not occur because the new bitmap is not saved. Original bitmap 108 will be maintained in persistent storage on the disk array and indicate that the valid portions of the file are in the original location. In this manner, atomic writes are preserved.

In FIG. 2, it is assumed that data for a single leaf is being modified. However, the subject matter described herein is not limited to modifying data for a single leaf. Data for multiple leaves may be modified by copying only the data for the leaves being modified to the new location on the disk array and updating the corresponding bits of the bitmap corresponding to the leaves being modified. In addition, in FIG. 2, step 206 assumes that a portion of a leaf is being modified. If an entire leaf is being modified, it is not necessary to copy the data for the leaf from the first location on the disk array to the new location on the disk array. All that is necessary is that the new data for the leaf be written to the new location on the disk array.

Figure 3:
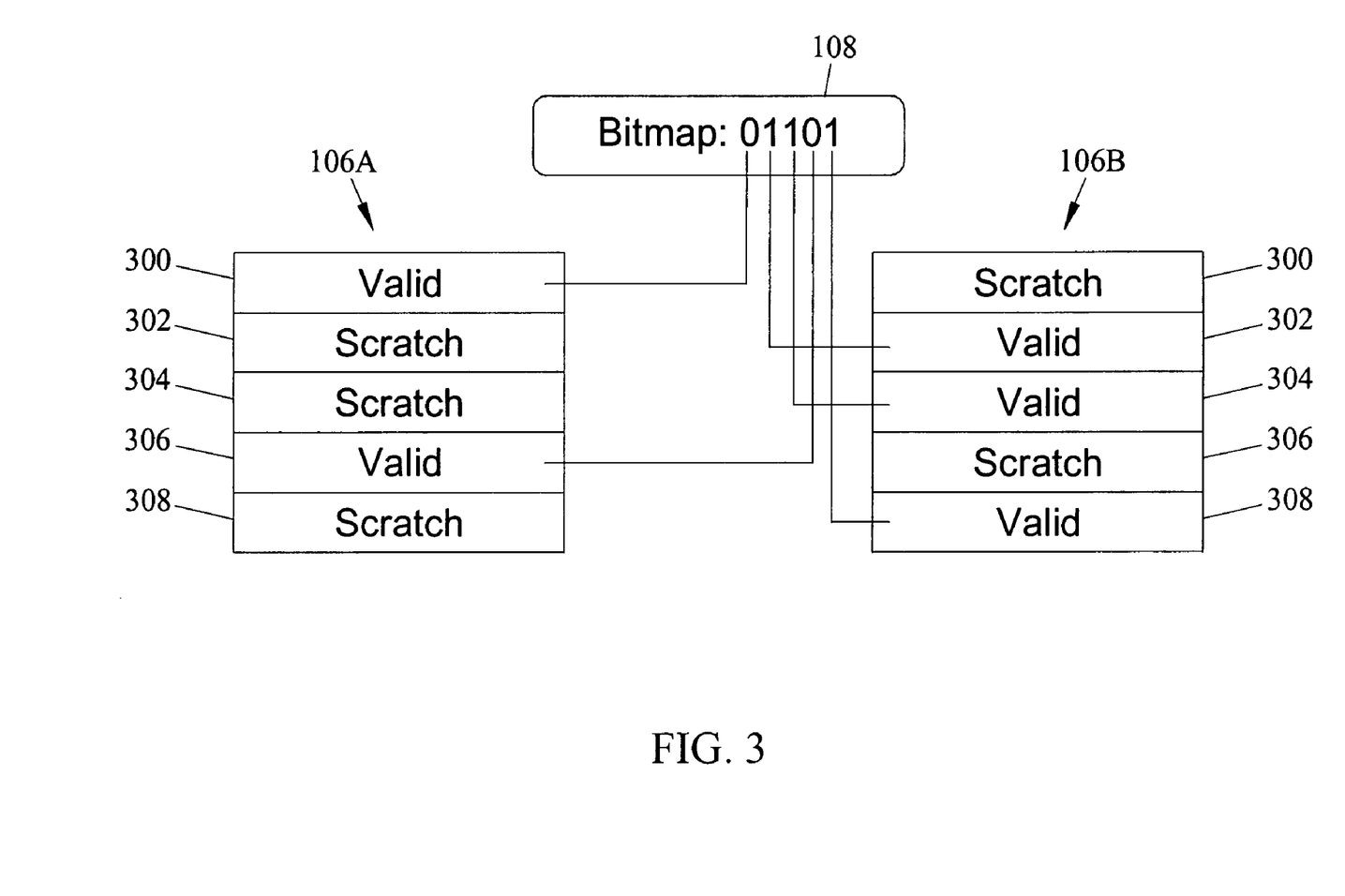
FIG. 3 is a block diagram illustrating a bitmap and scratch and valid leaves of a file stored on a disk array according to an embodiment of the subject matter described herein.

FIG. 3 is a block diagram illustrating an example of bitmaps, files, and file leaves for preserving atomic writes to a disk array according to an embodiment of the subject matter described herein. Referring to FIG. 3, bitmap 108 includes bits that correspond to leaves 300-308 of file sides 106A and 106B. Each file side 106A and 106B represents space allocated for leaves of the file. Each leaf 300-308 has a valid side and a scratch side, depending on where the last successful atomic write occurred. For example, for leaf 300, file side 106A is the valid side and file side 106B is the scratch side, indicating either that leaf 300 has never been written to or that last valid write to leaf 300 was saved to file side 106A. If a subsequent write operation occurs affecting leaf 300, the data in leaf 300 would be copied to file side 106B and modified. If the write operation is successfully saved, file side 106B will become the valid side for leaf 300, and file side 106A will become the scratch side for leaf 300.

As stated above, a leaf is a portion of a file covered by one or more bits in bitmap 108. In the illustrated example, each bit in bitmap 108 covers a single leaf of the file. In one exemplary implementation, bitmap 108 may be of fixed length. Since files may be of variable length, the number of file bytes covered by each bit in bitmap 108 may vary depending on the file size. In one exemplary implementation, each bit in bitmap 108 covers a 512 byte or greater size chunk of data in each file.

As stated above, each bit in bitmap 108 represents the location of valid data in the file. In the illustrated example, a zero in the bitmap indicates that valid data for a leaf resides in file side 106A. A one indicates that valid data resides in file side 106B. Thus, the left-most zero in the bitmap indicates that file side 106A contains valid data for leaf 300. The next two bits in the bitmap indicate that the valid data for leaves 302 and 304 resides in file side 106B. The next bit indicates that the valid data for leaf 306 resides in file side 106A. The next bit indicates that the valid data for leaf 308 resides in file side 106B.

Figure 4:
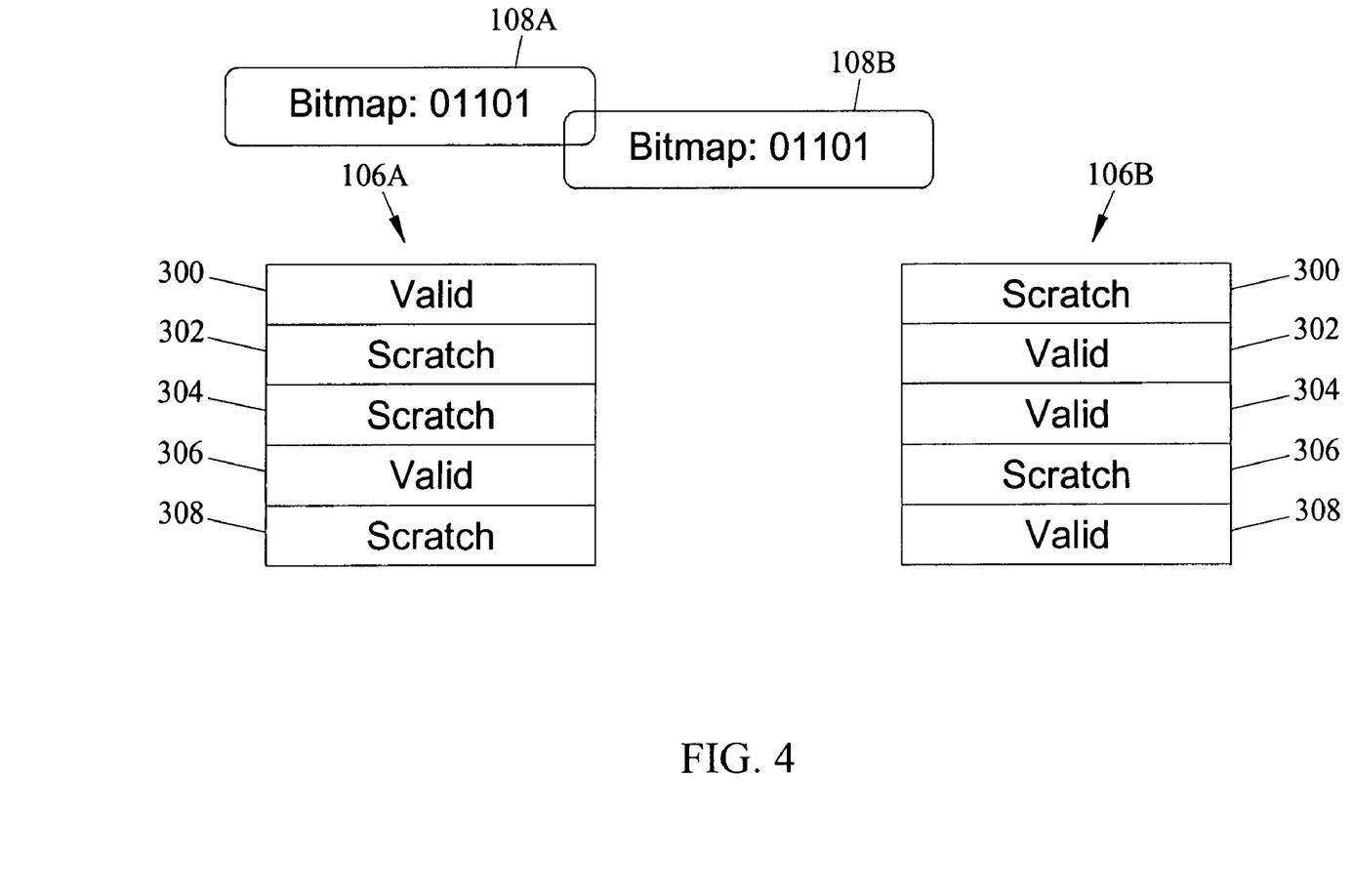
FIG. 4 is a block diagram illustrating copying of the bitmap of FIG. 3 to memory in response to an open operation according to an embodiment of the subject matter described herein.

FIG. 4 is a block diagram illustrating the state of the system in response to an open operation. An open operation may be the first step of a write operation. In one exemplary implementation, a write operation may include an open operation, which initiates the copying of data being modified from the valid side to the scratch side of a file, a write operation, which modifies the data on the scratch side and updates the bitmap copy, and a save operation, which saves the modified bitmap to the disk array, thereby completing the atomic write operation. In response to an open operation, the bitmap stored on the disk array is copied to memory. In FIG. 4 and in the subsequent figures herein, bitmap 108A is intended to represent the bitmap stored on the disk array, and bitmap 108B is intended to represent the bitmap stored in memory. Thus, in response to an open operation before any data is written, bitmap 108B stored in memory is an exact copy of bitmap 108A stored on the disk array.

Figure 5:
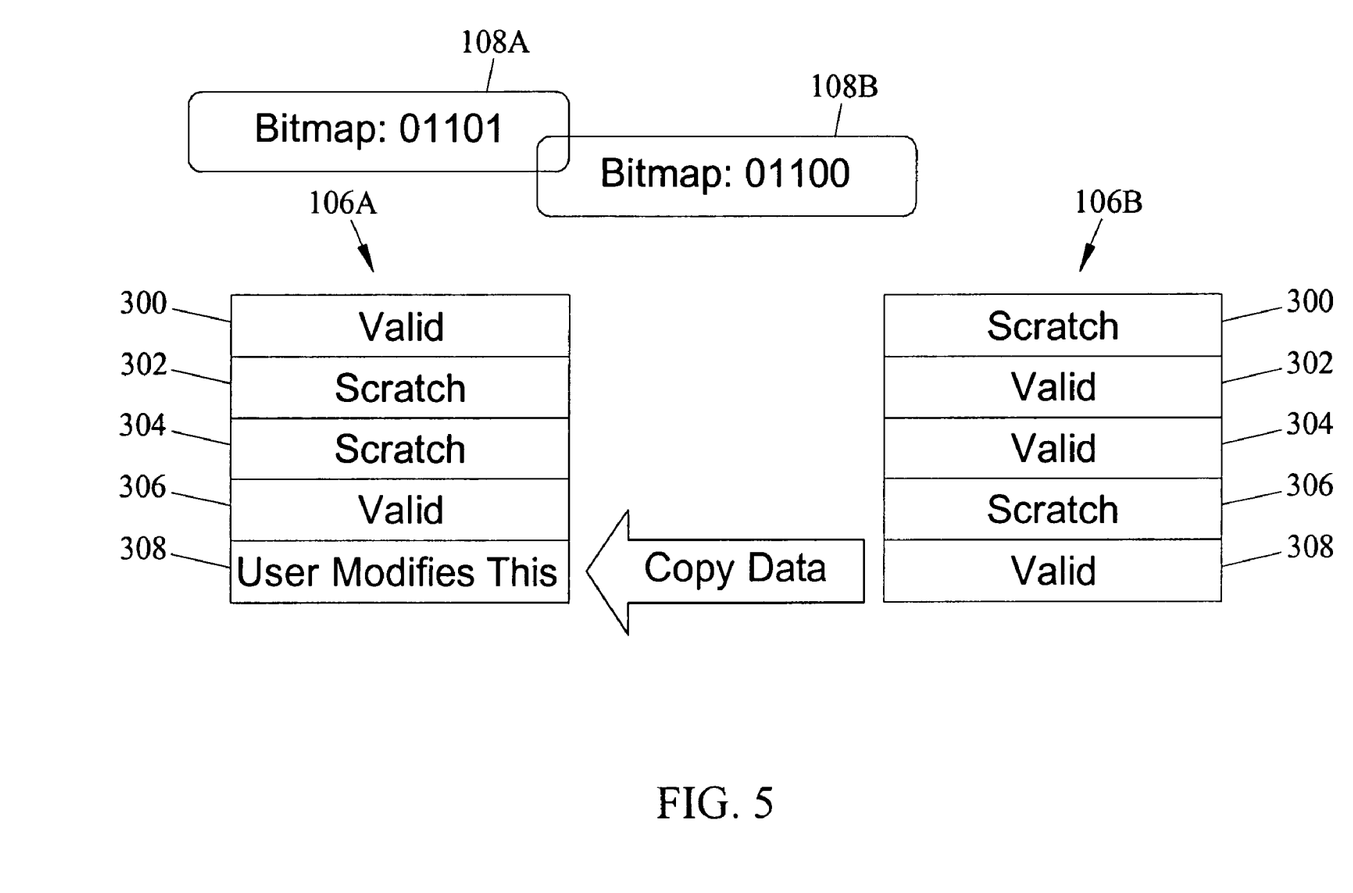
FIG. 5 is a block diagram illustrating exemplary state of a system in response to a modify operation according to an embodiment of the subject matter described herein.

FIG. 5 is a block diagram illustrating the state of a system in FIG. 4 in response to a write operation to leaf 308. In this example, valid data from leaf 308 is copied from file side 106B to file side 106A. The corresponding bit in bitmap copy 108B is modified to indicate that the valid data for leaf 308 resides in file side 106A. The user may modify copied data for leaf 308 in file side 106A. However, the original bitmap 108A is preferably maintained until a save operation occurs. Because the original bitmap is maintained until a save operation occurs, the write operation affecting leaf 308 is atomic. That is, the entire write operation will be completed and saved by writing over bitmap 108A with bitmap copy 108B, or bitmap 108A will not be altered and the last bit will still point to file side 106B. Thus, even though leaf 308 is modified, the bitmap stored on disk will point to the pre-modification data.

Figure 6:
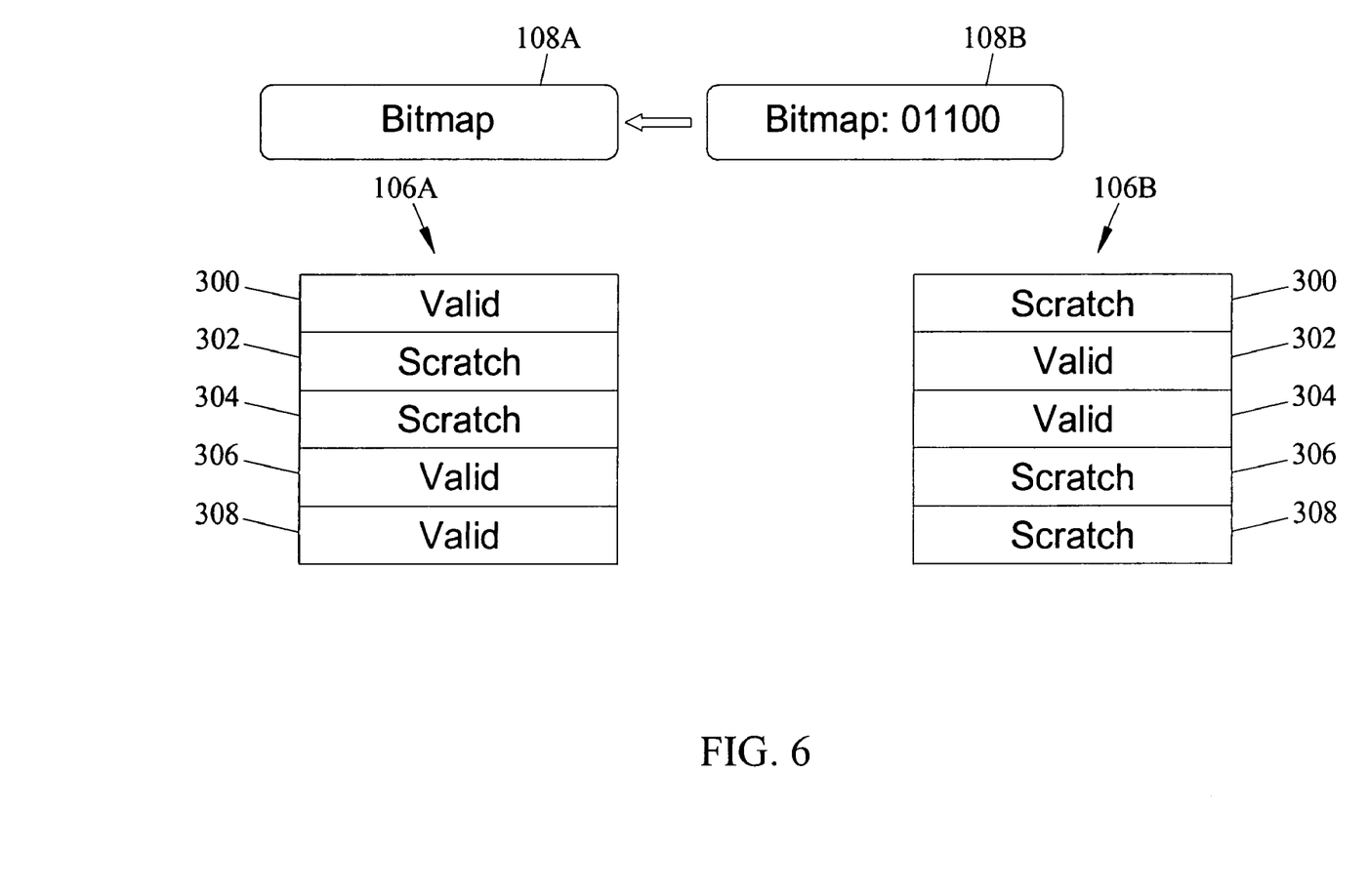
FIG. 6 is a block diagram illustrating an exemplary state of a system in response to a save operation according to an embodiment of the subject matter described herein.

FIG. 6 is a block diagram illustrating the state of the system illustrated in FIG. 5 after a save operation occurs. In this example, bitmap copy 108B replaces bitmap 108A on disk. If a save operation is not detected, original bitmap 108A will be maintained and will indicate that valid data for leaf 308 resides in file side 106B.

Thus, using the example described above, only the portion of the file being modified by a write operation is required to be copied to a new location on a disk array. As a result, I/O efficiency is increased over prior implementations where the entire file is required to be copied when only a portion of the file is modified.

It will be understood that various details of the invention may be changed without departing from the scope of the invention. Furthermore, the foregoing description is for the purpose of illustration only, and not for the purpose of limitation.

What is claimed is:

1. A method for preserving an atomic write to a disk array, the method comprising:
    (a) storing portions of a file in paired locations on a disk array such that a first location of a location pair for a file portion stores scratch data for the file portion and a second portion of the location pair for the file portion stores valid data for the file portion and storing a bitmap on the disk array, the bitmap having bits indicating whether valid data for each file portion resides in the first or the second location for its respective location pair;
    (b) receiving a write request to write data to a portion of the file being less than the entire file, wherein the bitmap indicates that valid data for the portion of the file to be written to resides in a first memory location of one of the location pairs on the disk array, and, in response:
        (i) copying the bitmap to memory;
        (ii) copying data for the portion of the file requested to be modified from the first location of the one location pair to a second location of the one location pair on the disk array without copying the entire file and modifying the data in the second location based on the data to be written;
        (iii) modifying the bitmap stored in memory to indicate that valid data for the portion of the file resides in the second location of the one location pair and that scrach data for the portion of the file resides in the first location on the disk array; and
    (c) receiving a request to save the modification, and, in response to the request to save the modified data, replacing the bitmap stored on the disk array with the modified bitmap.

2. The method of claim 1 wherein the bitmap comprises a fixed-size bitmap.

3. The method of claim 2 wherein storing a bitmap on a disk array includes storing a bitmap where each bit corresponds to one portion of the file and each portion has a size corresponding to the file size divided by the bitmap size.

4. The method of claim 3 wherein storing a bitmap on the disk array includes storing a bitmap where each bit covers at least 512 bytes of the file.

5. The method of claim 1 wherein copying the portion of the file being modified to the second memory location in the disk array includes copying only the portion being modified to the second memory location.

6. The method of claim 1 comprising, in response to failing to receive a save request, retaining the bitmap without modification on the disk array.

7. A system for preserving atomic writes to a disk array, the system comprising:
    (a) a disk array for storing portions of a file in paired locations on the disk array such that a first location of a location pair for a file portion stores scratch data for the file portion and a second portion of the location pair for the file portion stores valid data for the file portion and for storing a bitmap on the disk array, the bitmap having bits indicating whether valid data for each file portion resides in the first or the second location for its respective location pair; and
    (b) a persistent storage manager embodied in a computer readable medium associated with the disk array for, in response to a write request for writing data to a portion of the file for which the bitmap indicates valid data is stored in a first location of the location pairs on the disk array, for copying the bitmap to memory, for copying data for a the portion of the file being modified by the write request from the first location of the one location pair to the second location of the one location pair and for modifying the data stored in the second location based on the data requested to be written, for modifying the bitmap to indicate that valid data for the portion of the file being modified by the write resides in the second location of the one location pair and that scratch data resides in the first location of the one location pair, and, for, in response to a save operation, for replacing the bitmap stored on the disk array with the modified bitmap copy.

8. The system of claim 7 wherein the bitmap includes a fixed number of bits.

9. The system of claim 7 wherein each portion of the file is equal in size to the size of the file divided by the size of the bitmap.

10. The system of claim 7 wherein each bit in the bitmap covers at least 512 bytes of data.

11. The system of claim 7 wherein the persistent storage manager is adapted to copy only data for portions of the file being modified to the second location.

12. The system of claim 7 wherein the persistent storage manager is adapted to retain the original bitmap on the disk array in response to failing to detect a save operation.

13. A computer program product comprising computer-executable instructions embodied in a computer-readable medium for performing steps comprising:
    (a) storing portions of a file in paired locations on a disk array such that a first location of a location pair for a file portion stores scratch data for the file portion and a second portion of the location pair for the file portion stores valid data for the file portion and storing a bitmap on the disk array, the bitmap having bits indicating whether valid data for each file portion resides in the first or the second location for its respective location pair;
    (b) receiving a write request to write data to a portion of the file being less than the entire file, wherein the bitmap indicates that valid data for the portion of the file to be written to resides in a first memory location of one of the location pairs on the disk array, and, in response:

(i) copying the bitmap to memory;

(ii) copying data for the portion of the file requested to be modified from the first location of the one location pair to a second location of the one location pair on the disk array without copying the entire file and modifying the data in the second location based on the data to be written;

(iii) modifying the bitmap stored in memory to indicate that valid data for the portion of the file resides in the second location of the one location pair and that scratch data resides in the first location of the one location pair on the disk array; and (c) receiving a request to save the modification, and, in response to the request to save the modified data, replacing the bitmap stored on the disk array with the modified bitmap.

14. The computer program product of claim 13 wherein storing a bitmap having bits indicating where data for each leaf portion of a file on the disk array includes storing the bitmap comprises a fixed-size bitmap on the disk array.

15. The computer program product of claim 14 wherein storing a bitmap on a disk array includes storing a bitmap where each bit corresponds to one portion of the file and each portion has a size corresponding to the file size divided by the bitmap size.

16. The computer program product readable medium of claim 15 wherein storing a bitmap on the disk array includes storing a bitmap where each bit covers at least 512 bytes of the file.

17. The computer program product of claim 13 wherein copying the portion of the file being modified to the second location in the disk array includes copying only the portion being modified to the second location.

18. The computer program product of claim 13 comprising, in response to failing to receive a save request, retaining the bitmap without modification on the disk array.

* * * * *